(12) United States Patent
Kihara

(10) Patent No.: US 7,338,632 B2
(45) Date of Patent: Mar. 4, 2008

(54) HYDROGEN-STORING ALLOY ELECTRODE AND SECONDARY CELL USING THE SAME

(75) Inventor: Masaru Kihara, Takasaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 377 days.

(21) Appl. No.: 11/190,939

(22) Filed: Jul. 28, 2005

(65) Prior Publication Data

US 2006/0024581 A1    Feb. 2, 2006

(30) Foreign Application Priority Data

Jul. 30, 2004    (JP) ............................. 2004-223537

(51) Int. Cl.
    *H01M 4/36*    (2006.01)
    *H01M 10/24*   (2006.01)
(52) U.S. Cl. .................... 420/900; 429/218.2
(58) Field of Classification Search ................ 420/900, 420/455; 429/218.2
    See application file for complete search history.

(56) References Cited

U.S. PATENT DOCUMENTS

| | | | |
|---|---|---|---|
| 5,536,586 A * | 7/1996 | Tsushio et al. | 428/649 |
| 5,554,456 A * | 9/1996 | Ovshinsky et al. | 429/59 |
| 5,853,919 A * | 12/1998 | Kohno et al. | 429/223 |
| 5,876,869 A * | 3/1999 | Nakamura et al. | 429/59 |
| 6,492,056 B1 * | 12/2002 | Ovshinsky | 429/40 |
| 2004/0159377 A1 * | 8/2004 | Takamaru et al. | 148/513 |
| 2005/0129566 A1 * | 6/2005 | Fetcenko et al. | 420/441 |

FOREIGN PATENT DOCUMENTS

| | | |
|---|---|---|
| JP | 2000-73132 | 3/2000 |
| JP | 2001-291511 A | 10/2001 |

* cited by examiner

*Primary Examiner*—Frank M. Lawrence
(74) *Attorney, Agent, or Firm*—Westerman, Hattori, Daniels & Adrian, LLP.

(57) ABSTRACT

A secondary cell has a hydrogen-storing alloy electrode as a negative-electrode plate 26, and the electrode contains first hydrogen-storing alloy particles 36 and second hydrogen-storing alloy particles 37. The first hydrogen-storing alloy particles 36 has composition expressed by general expression (I) $(La_{a1}Ce_{b1}Pr_{c1}Nd_{d1}(A1)_{e1})_{1-x}Mg_x(Ni_{1-y}(T1)_y)_z$, where A1 represents at least one element selected from a group consisting of Pm, Sm, Eu, Gd, Tb, Dy, Ho, Er, Tm, Yb, Lu, Ca, Sr, Sc, Y, Ti, Zr and Hf; T1 represents at least one element selected from a group consisting of V, Nb, Ta, Cr, Mo, Mn, Fe, Co, Al, Ga, Zn, Sn, In, Cu, Si, P and B; a1, b1, c1, d1 and e1 are in the range of $0<a1\leq0.25$, $0\leq b1$, $0\leq c1$, $0\leq d1$ and $0\leq e1$ and satisfy the relation $a1+b1+c1+d1+e1=1$; and x, y and z are in the range of $0<x<1$, $0\leq y\leq0.5$ and $2.5\leq z\leq4.5$.

17 Claims, 1 Drawing Sheet

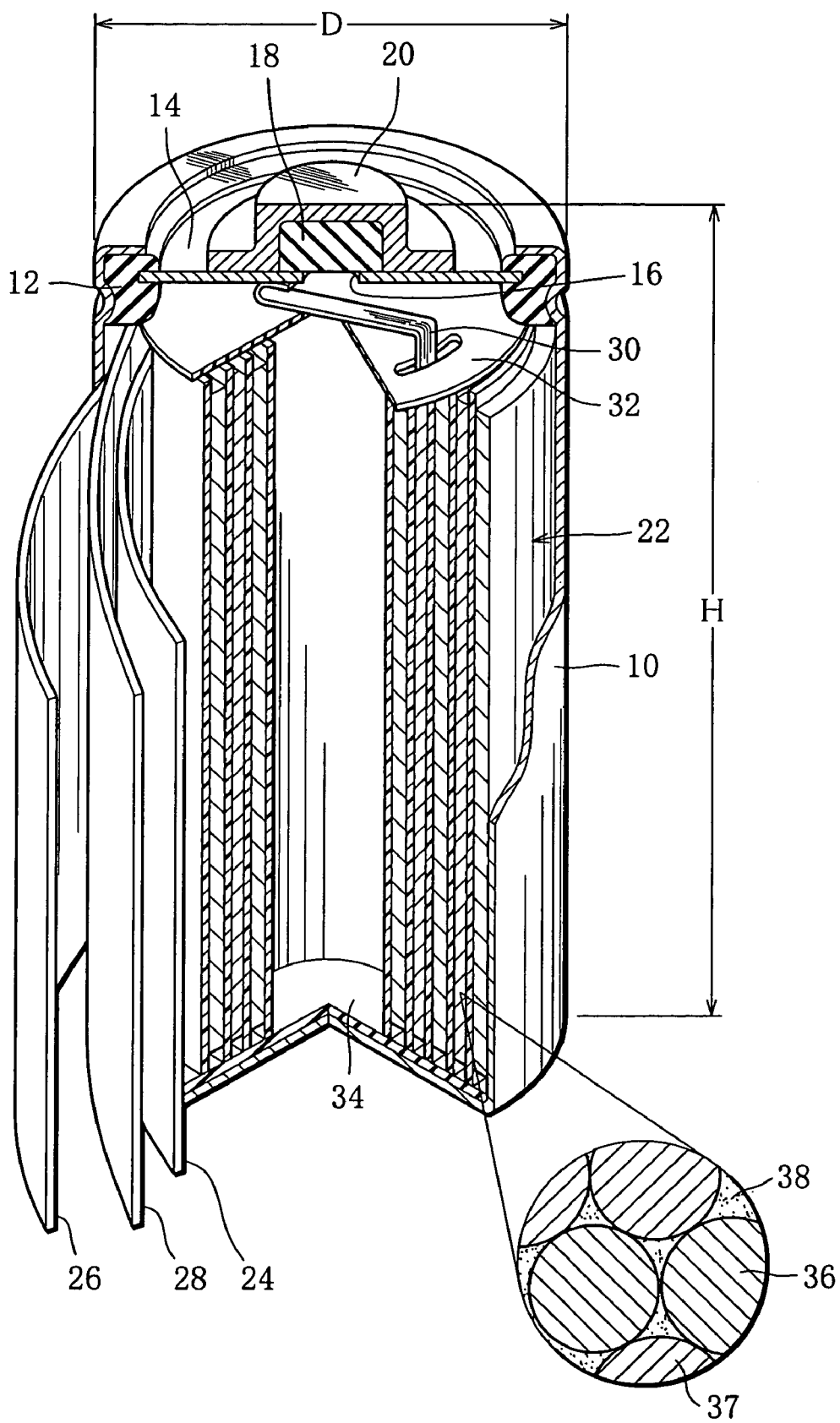

HYDROGEN-STORING ALLOY ELECTRODE AND SECONDARY CELL USING THE SAME

BACKGROUND OF THE INVENTION

1. Field of the Invention

The invention relates to a hydrogen-storing alloy electrode and a secondary cell using the same.

2. Description of the Related Art

The hydrogen-storing alloy has been drawing attention as an energy conversion material and as an energy storage material, since it can store hydrogen safely and easily. Further, there is a great demand for the nickel-hydrogen secondary cell using the hydrogen storing alloy for the negative electrode, for consumer use, because of its characteristics such that it has a high capacity and that it is cleaner than the cells using lead or cadmium.

Specifically, the hydrogen storing alloys of this type are alloys of a metal element that can form a stable compound with hydrogen (any of Pd, Ti, Zr, V, rare-earth elements, alkaline-earth metal elements, etc.) and another metal element, and classified into $AB_5$ type, $AB_2$ type, etc. according to the crystal structure. In these crystal structures, the A site is occupied by the former metal element and the B site is occupied by the latter metal element. When the A site is occupied by a rare-earth element, the alloy is also called rare-earth alloy.

Generally, $AB_5$-type rare-earth alloys such as $LaNi_5$ are used for the nickel-hydrogen secondary cell. However, the discharge capacity of this type of cell is already higher than 80% of the theoretical capacity, so that there is a limit to enhancing the capacity further. Meanwhile, the rare-earth magnesium alloy obtained by replacing the rare-earth element in the $AB_5$-type rare-earth alloy partly with Mg has a characteristic that it can store a larger amount of hydrogen gas than the $AB_5$-type rare-earth alloy at temperatures close to the room temperature. Hence, the development of the secondary cell using the rare-earth magnesium alloy has been advanced.

For example, Japanese Unexamined Patent Publication No. 2000-73132 discloses a secondary cell using a rare-earth magnesium alloy. However, this rare-earth magnesium alloy is low in alkaline resistance. Hence, the secondary cell using this alloy solely has a problem that the cell life is short.

This problem comes from the fact: magnesium in the rare-earth magnesium alloy corrodes by reaction with an alkaline electrolyte, which decreases the negative-electrode capacity, and this corrosion reaction also consumes the alkaline electrolyte that should contribute to the cell reaction, so that the internal resistance of the cell gradually increases.

This consumption of the alkaline electrolyte is more prominent when the secondary cell has higher volume energy density. The reason is: in such cell, since the volumetric proportion of the positive electrode relative to the cell is increased, the amount of the alkaline electrolyte is originally smaller. Hence, decrease of the alkaline electrolyte easily leads to increase in internal resistance.

The inventor has developed a rare-earth magnesium hydrogen-storing alloy having high alkaline resistance and made a secondary cell using this. While this secondary cell has a longer cell life, another problem has been found: the cell that was charged continuously and then discharged shows a decreased discharge capacity after the next charging (referred to as "discharge capacity in re-discharging"). In other words, the cell has an inferior continuous-charging characteristic.

SUMMARY OF THE INVENTION

An object of this invention is to provide a hydrogen-storing alloy electrode which contains rare-earth magnesium hydrogen-storing alloy but has high alkaline resistance and a good continuous-charging characteristic and is suited to improve the volume energy density.

Another object of this invention is to provide a secondary cell in which the use of the above-mentioned hydrogen-storing alloy electrode contributes to increase in volume energy density, and which has a good continuous-charging characteristic and a long life.

In studies conducted to achieve the above objects, the inventor obtained the knowledge that by using rare-earth magnesium alloy along with $AB_5$-type hydrogen-storing alloy for the hydrogen-storing alloy electrode, the alkaline resistance (corrosion resistance) of the hydrogen-storing alloy electrode is improved and decrease in discharge capacity in re-discharging is prevented, and reached the present invention.

In order to achieve the above object, the present invention provides a hydrogen-storing alloy electrode comprising: first hydrogen-storing alloy particles having composition expressed by general expression (I):

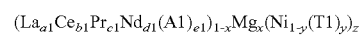

where A1 represents at least one element selected from a group consisting of Pm, Sm, Eu, Gd, Tb, Dy, Ho, Er, Tm, Yb, Lu, Ca, Sr, Sc, Y, Ti, Zr and Hf; T1 represents at least one element selected from a group consisting of V, Nb, Ta, Cr, Mo, Mn, Fe, Co, Al, Ga, Zn, Sn, In, Cu, Si, P and B; a1, b1, c1, d1 and e1 are in the range of $0<a1\leq 0.25$, $0\leq b1$, $0\leq c1$, $0\leq d1$ and $50\leq e1$ and satisfy the relation $a1+b1+c1+d1+e1=1$; and x, y and z are in the range of $0<x<1$, $0\leq y\leq 0.5$ and $2.5\leq z\leq 4.5$; and second hydrogen-storing alloy particles having composition expressed by general expression (II):

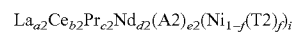

where A2 represents at least one element selected from a group consisting of Pm, Sm, Eu, Gd, Tb, Dy, Ho, Er, Tm, Yb, Lu, Ca, Sr, Sc, Y, Ti, Zr and Hf; T2 represents at least one element selected from a group consisting of V, Nb, Ta, Cr, Mo, Mn, Fe, Co, Al, Ga, Zn, Sn, In, Cu, Si, P and B; a2, b2, c2, d2 and e2 are in the range of $0\leq a2$, $0\leq b2$, $0.01\leq c2$, $0.01\leq d2$ and $0\leq e2$ and satisfy the relation $a2+b2+c2+d2+e2=1$; and f and i are in the range of $0\leq f\leq 1$ and $4.5\leq i\leq 5.5$.

The hydrogen-storing alloy electrode according to this invention is suited to improve the volume energy density because of the first hydrogen-storing alloy particles contained therein. Further, this electrode has an improved alkaline resistance (corrosion resistance) and hence a longer life, because of the second hydrogen-storing alloy particles contained therein. In particular, in this electrode, by decreasing the proportion of La in the first hydrogen-storing alloy particles, corrosion reaction in which magnesium contained in the first hydrogen-storing alloy particles reacts with an alkaline solution to form magnesium hydroxide is suppressed.

In a preferable arrangement, the proportion of the mass of the second hydrogen-storing alloy particles relative to the total mass of the first and second hydrogen-storing alloy particles is in the range of 5% to 50%.

When the proportion of the mass of the second hydrogen-storing alloy particles is set to 5% or higher, the electrode has a longer life with certainty, compared with the case in which the first hydrogen-storing alloy particles are used solely.

Meanwhile, the proportion of the mass of the second hydrogen-storing alloy particles is set to 50% or lower, in order to prevent decrease in cell capacity caused by increase of the second hydrogen-storing alloy particles which is lower in capacity than the first hydrogen-storing alloy particles, and in order to prevent decrease in discharge capacity immediately after continuous charging. When the proportion by mass of the second hydrogen-storing alloy particles is great, oxygen produced in overcharging is not sufficiently reduced, so that the hydrogen-storing alloy particles deteriorate by oxidation, which causes decrease in discharge capacity. Hence, in this electrode, the proportion by mass of the second hydrogen-storing alloy particles is limited to ensure that oxygen produced in overcharging is sufficiently reduced to thereby prevent the decrease in discharge capacity caused by the deterioration of the hydrogen-storing alloy particles due to oxidation.

In a preferable arrangement, b1 in general expression (I) is 0.2 or smaller, b2 in general expression (II) is 0.05 or greater. More desirably, b2 in general expression (II) is 0.1 or greater.

In this preferable arrangement, by decreasing the proportion of Ce in the first hydrogen-storing alloy particles, the corrosion reaction in which magnesium contained in the first hydrogen-storing alloy particles reacts with an alkaline solution to form magnesium hydroxide can be suppressed.

In this preferable arrangement, decrease in discharge capacity in re-discharging can also be suppressed.

The problem that the discharge capacity decreases in re-discharging is observed, when the proportion of Ce in the first hydrogen-storing alloy particles is small, so that the amount of Ce contained in the secondary cell is small. Hence, in this preferable arrangement, in order to hold an adequate amount of Ce in the hydrogen-storing alloy electrode or in the secondary cell even when the proportion of Ce in the first hydrogen-storing alloy particles is small, the proportion of Ce in the second hydrogen-storing alloy particles is increased.

In a preferable arrangement, c1 in general expression (I) is 0.30 or smaller, and in another preferable arrangement, d1 in general expression (I) is 0.30 or smaller.

In these preferable arrangements, by decreasing the proportion of Nd or the proportion of Pr, the corrosion reaction of the first hydrogen-storing alloy particles can be further suppressed.

In a preferable arrangement, the first hydrogen-storing alloy particles are lower in equilibrium hydrogen pressure than the second hydrogen-storing alloy particles, and in another preferable arrangement, the first hydrogen-storing alloy particles are greater in average particle size than the second hydrogen-storing alloy particles.

In these preferable arrangements, decrease in discharge capacity immediately after continuous charging can be prevented. Besides, the latter arrangement enables a longer cell life.

When the positive-electrode is overcharged in continuous charging, γ-NiOOH which is low in discharge performance is produced, so that the operating voltage decreases. However, decrease in discharge performance of the cell as a whole can be prevented by improving the discharge performance of the hydrogen-storing alloy electrode. Hence, in these preferable arrangements, by improving the discharge performance of the second hydrogen-storing alloy particles, which are lower in discharge performance than the first hydrogen-storing alloy particles, by increasing the equilibrium hydrogen pressure or decreasing the particle size, decrease in discharge capacity immediately after continuous charging is prevented.

The first hydrogen-storing alloy particles are low in alkaline resistance. Hence, by making the particle size of the first hydrogen-storing alloy particles greater than that of the second hydrogen-storing alloy particles to thereby decrease the surface area of the first hydrogen-storing alloy particles, the first hydrogen-storing alloy particles can be prevented from corroding, so that the cell can have a longer life.

In order to the above-mentioned object, the present invention also provides a secondary cell comprising:

a positive-electrode plate;

a hydrogen-storing alloy electrode as a negative-electrode plate, the electrode including, first hydrogen-storing alloy particles having composition expressed by general expression (I):

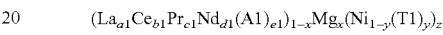

where A1 represents at least one element selected from a group consisting of Pm, Sm, Eu, Gd, Tb, Dy, Ho, Er, Tm, Yb, Lu, Ca, Sr, Sc, Y, Ti, Zr and Hf; T2 represents at least one element selected from a group consisting of V, Nb, Ta, Cr, Mo, Mn, Fe, Co, Al, Ga, Zn, Sn, In, Cu, Si, P and B; a1, b1, c1, d1 and e1 are in the range of $0 < a1 \leq 0.25$, $0 \leq b1$, $0 \leq c1$, $0 \leq d1$ and $0 \leq e1$ and satisfy the relation $a1+b1+c1+d1+e1=1$; and x, y and z are in the range of $0<x<1$, $0 \leq y \leq 0.5$ and $2.5 \leq z \leq 4.5$, and second hydrogen-storing alloy particles having composition expressed by general expression (II):

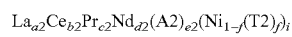

where A2 represents at least one element selected from a group consisting of Pm, Sm, Eu, Gd, Tb, Dy, Ho, Er, Tm, Yb, Lu, Ca, Sr, Sc, Y, Ti, Zr and Hf; T2 represents at least one element selected from a group consisting of V, Nb, Ta, Cr, Mo, Mn, Fe, Co, Al, Ga, Zn, Sn, In, Cu, Si, P and B; a2, b2, c2, d2 and e2 are in the range of $0 \leq a2$, $0 \leq b2$, $0.01 \leq c2$, $0.01 \leq d2$ and $0 \leq e2$ and satisfy the relation $a2+b2+c2+d2+e2=1$; and f and i are in the range of $0 \leq f \leq 1$ and $4.5 \leq i \leq 5.5$; and a separator inserted between the positive-electrode plate and the negative-electrode plate and holding an alkaline electrolyte.

The secondary cell according to the present invention includes a hydrogen-storing alloy electrode, which is suited to improve the volume energy density because of the first hydrogen-storing alloy particles contained therein. Further, this electrode has an improved alkaline resistance (corrosion resistance) and hence a longer life, because of the second hydrogen-storing alloy particles contained therein. Consequently, this secondary cell has an improved volume energy density, a good continuous-charging characteristic and a long life.

In a preferable arrangement, the secondary cell includes a cylindrical case having an outside diameter in the range of 13.5 mm to 14.5 mm, an electrode assembly having the positive-electrode plate, the negative-electrode plate and the separator rolled up together is set in the case with the outermost turn of the negative-electrode plate being in contact with the inner circumferential surface of the case, the secondary cell has a volume energy density in the range of 340 Wh/l to 450 Wh/l, and the volumetric proportion of the positive-electrode plate is in the range of 48% to 60%.

In this preferable arrangement, by arranging that the volumetric proportion of the positive-electrode plate is 48% or greater, the volume energy density of 340 Wh/l or greater can be achieved with certainty, in the cell having a case having an outside diameter in the range of 13.5 mm to 14.5 mm.

In this arrangement, the corrosion reaction between magnesium in the hydrogen-storing alloy contained in the negative-electrode plate and the alkaline electrolyte is suppressed. Hence, decrease in negative-electrode capacity is suppressed, and the alkaline electrolyte held in the separator is not consumed in corrosion reaction. Consequently, increase in internal resistance is suppressed.

BRIEF DESCRIPTION OF THE DRAWING

The present invention will become more fully understood from the detailed description given hereinbelow and the accompanying drawing which is given by way of illustration only, and thus, is not limitative of the present invention, and the FIGURE is a perspective cutaway view showing an example of a secondary cell in an embodiment of this invention, where, in the circle, part of a negative-electrode plate is schematically shown on an enlarged scale.

DETAILED DESCRIPTION

As a secondary cell in an embodiment of the present invention, a nickel-hydrogen secondary cell will be described below in detail.

This cell is a cylindrical cell of size AA. As shown in the Figure, the cell has a case 10 in the form of a cylinder closed at the bottom and open at the top. The case 10 has an outside diameter D which is in the range of 13.5 mm to 14.5 mm. The bottom of the case 10 functions as an electrically-conductive negative-electrode terminal. Inside the opening of the case 10 is arranged an electrically-conductive disk-shaped cover plate 14 with a ring-shaped insulating gasket 12. By caulking the rim of the case 10, the cover plate 14 and the insulating gasket 12 are fixed to the rim of the case 10.

The cover plate 14 has a gas release hole 16 in the center, and a valve body 18 of rubber is placed on the outer surface of the cover plate 14 to cover the gas release hole 16. Further, a positive-electrode terminal 20 in the form of a cylinder with a flange is fixed on the outer surface of the cover plate 14 to cover the valve body 18. The positive-electrode terminal 20 presses the valve body 18 against the cover plate 14. Hence, normally, the case 10 is closed air-tightly by means of the insulating gasket 12, the cover plate 14 and the valve body 18. Meanwhile, when gas is produced inside the case 10 and the internal pressure in the case 10 increases, the valve body 18 is compressed, so that the gas is released from the case 10 through the gas release hole 16. Thus, the cover plate 14, the valve body 18 and the positive-electrode terminal 20 constitute a safety valve.

Here, the length from the top of the positive-electrode terminal 20 to the bottom of the case 10, namely the height H of the cell is in the range of 49.2 mm to 50.5 mm. The volume Vb of the cell is defined, as equal to the volume of a cylinder of outside diameter D and height H, by the expression:

$$Vb = \pi(D/2)^2 \times H.$$

In the case 10 is contained an electrode assembly 22. The electrode assembly 22 consists of a positive-electrode plate 24, a negative-electrode plate 26 and a separator 28, each in the form of a strip. They are rolled up with the separator 28 inserted between the positive-electrode plate 24 and the negative-electrode plate 26. In other words, the negative-electrode plate 26 is laid over the positive-electrode plate 24 with the separator 28 between. The outermost circumferential part of the electrode assembly 22 is formed by the negative-electrode plate 26 (the outermost turn thereof). By the outermost turn of the negative-electrode plate 26 being in contact with the inner circumferential surface of the case 10, the negative-electrode plate 26 and the case 10 are electrically connected. The positive-electrode plate 24, the negative-electrode plate 26 and the separator 28 will be described later.

Inside the case 10, a positive-electrode lead 30 is arranged between an end of the electrode assembly 22 and the cover plate 14. The positive-electrode lead 30 is connected with the positive-electrode plate 24 and the cover plate 14 at each end. Hence, the positive-electrode terminal 20 and the positive-electrode plate 24 are electrically connected by the positive-electrode lead 30 and the cover plate 14. Between the cover plate 14 and the electrode assembly 22 is arranged a round insulating piece 32, and the positive-electrode lead 30 passes through a slit formed in the insulating piece 32. Between the electrode assembly 22 and the bottom of the case 10 is also arranged a round insulating piece 34.

Further, a predetermined amount of an alkaline electrolyte (not shown) is put into the case 10, and charging and discharging reactions proceed between the positive-electrode plate 24 and the negative-electrode plate 26 through the alkaline electrolyte held in the separator 28.

The alkaline electrolyte is not limited to a specific one. For example, an aqueous sodium hydroxide solution, an aqueous lithium hydroxide solution, an aqueous potassium hydroxide solution, or a mixture of two or more of these aqueous solutions can be used. The concentration of the alkaline electrode is not limited to a specific value. For example, the alkaline electrode of 8N can be used.

As the material for the separator 28, for example, nonwoven fabric of polyamide fiber or nonwoven fabric of polyolefin fiber with a hydrophilic functional group added can be used. The latter can be nonwoven fabric of polyethylene or polypropylene fiber.

The positive-electrode plate 24 has a size predetermined so that the volumetric proportion of the positive-electrode plate 24 is in the range of 48% to 60%. Here, the volumetric proportion of the positive-electrode plate 24 is the value $Vp/(L \times S)$ expressed in percentage, where L is the axial length of the electrode assembly 22 excluding the separator 28, and S is the transverse cross-sectional area of the cylindrical space enclosed by the inner circumferential wall of the case 10.

The volume Vp of the positive-electrode plate 24 is the volume of the positive-electrode plate 24 as contained in the case 10, and obtained as follows: First, the vertical cross-sectional image and transverse cross-sectional image of the cell are obtained by the X-ray CT scanner. Then, on the transverse cross-sectional image obtained, the length of the inner surface of the positive-electrode plate 24 along the spiral of the positive-electrode plate 24, namely the length of the surface thereof closer to the central axis of the electrode assembly 22 along the spiral thereof is measured. On the vertical cross-sectional image, the thickness of the positive-electrode plate 24 along the diameter of the electrode assembly, and the length of the positive-electrode plate 24 along the axis of the electrode assembly are measured. By multiplying the length of the inner surface of the positive-electrode 24 along the spiral thereof, the thickness thereof along the diameter of the electrode assembly, and the length thereof along the axis of the electrode assembly obtained like this, the volume Vp is obtained.

The length of the inner surface of the positive-electrode 24 along the spiral thereof almost corresponds to the length of the positive-electrode plate 24 before rolled up, the thickness of the positive-electrode 24 along the diameter of the electrode assembly almost corresponds to the thickness of the positive-electrode plate 24 before rolled up, and the length of the positive-electrode 24 along the axis of the electrode assembly almost corresponds to the width of the positive-electrode plate 24 before rolled up.

The positive-electrode plate 24 comprises a electrically-conductive and porous positive-electrode substrate, and a positive-electrode mixture held in the pores of the positive-electrode substrate. The positive-electrode mixture includes particles of a positive-electrode active material, particles of an additive for improving a property of the positive-electrode plate 24 added as necessary, and a binder for making the mixed particles of the positive-electrode active material and additive stick to the positive-electrode substrate.

Here, the amount of the positive-electrode active material contained in the positive-electrode mixture in the positive-electrode plate 24 is set so that the volume energy density of the cell is in the range of 340 Wh/l to 450 Wh/l. The volume energy density of the cell is the value X/Vb, where X is given by multiplying the 0.2 C capacity of the cell by the operating voltage of 1.2 V, and Vb is the above-mentioned volume of the cell.

The 0.2 C capacity of the cell is defined by JIS C 8708-1997, and measured as follows: First, at the ambient temperature of 20±5° C., the cell is charged with a current corresponding to 0.1 C for 16 hours. The cell charged is left to rest for 1 to 4 hours. Then, the cell which was left to rest is discharged with a current corresponding to 0.2 C up to the discharge termination voltage 1.0V. In this discharging, the discharge capacity is measured. The discharge capacity measured like this is the 0.2 C capacity.

As the positive-electrode active material particles, nickel hydroxide particles are used, since the cell is a nickel-hydrogen secondary cell. The nickel hydroxide particles may be a solid solution containing, for example, cobalt, zinc or cadmium. Alternatively, the nickel hydroxide particles may be coated with an alkali-heat-treated cobalt compound.

The additive is not limited to a specific one. Besides yttrium oxide, metal cobalt, a cobalt compound such as cobalt oxide or cobalt hydroxide, metal zinc, a zinc compound such as zinc oxide or zinc hydroxide, or a rare-earth compound such as erbium oxide can be used, for example. The binder is not limited to a specific one. A hydrophilic or hydrophobic polymer can be used, for example.

The negative-electrode plate 26 is an electrode called a hydrogen-storing alloy electrode. The negative-electrode plate 26 includes a strip-shaped electrically-conductive negative-electrode substrate, which supports a negative-electrode mixture. The negative-electrode substrate is a metal plate with through-holes distributed. For example, a punching metal plate or a sintered metal powder plate made by molding and sintering metal powder can be used. The negative-electrode mixture is packed in the through-holes of the negative-electrode substrate and applied onto both surfaces of the negative-electrode substrate to form layers.

As schematically shown in the circle in the FIGURE, the negative-electrode mixture comprises particles 36 of a rare-earth magnesium alloy as a hydrogen-storing alloy capable of storing and releasing hydrogen as the negative-electrode active material, particles 37 of an $AB_5$-type rare-earth alloy as a hydrogen-storing alloy, an electrically-conductive auxiliary agent such as carbon (not shown) added as necessary, and a binder 38 for making the particles 36, 37 of the hydrogen storing alloys and the electrically-conductive auxiliary agent stick to the negative-electrode substrate. As the binder 38, for example, a hydrophilic or hydrophobic polymer can be used. As the electrically-conductive auxiliary agent, carbon black or graphite can be used. When the active material is hydrogen, the negative-electrode capacity is determined by the amount of the hydrogen-storing alloy. Hence, in the present invention, the hydrogen-storing alloy is also called a negative-electrode active material.

As mentioned above, the hydrogen-storing alloy particles 36 in this cell are the particles of a rare-earth magnesium alloy, whose crystal structure is a superlattice structure consisting of the $AB_5$ structure and the $AB_2$ structure. The composition of the hydrogen-storing alloy particles 36 is expressed by general expression (I):

$$(La_{a1}Ce_{b1}Pr_{c1}Nd_{d1}(A1)_{e1})_{1-x}Mg_x(Ni_{1-y}(T1)_y)_z$$

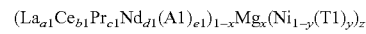

where A1 represents an element which occupies the A site, and which is at least one element selected from a group consisting of Pm, Sm, Eu, Gd, Tb, Dy, Ho, Er, Tm, Yb, Lu, Ca, Sr, Sc, Y, Ti, Zr and Hf; T1 represents an element which occupies the B site, and which is at least one element selected from a group consisting of V, Nb, Ta, Cr, Mo, Mn, Fe, Co, Al, Ga, Zn, Sn, In, Cu, Si, P and B; a1, b1, c1, d1 and e1 are in the range of $0<a1\leq0.25$, $0\leq b1$, $0\leq c1$, $0\leq d1$ and $0\leq e1$ and satisfy the relation $a1+b1+c1+d1+e1=1$; and x, y and z are in the range of $0<x<1$, $0\leq y\leq0.5$ and $2.5\leq z\leq4.5$.

The reason for limiting the values of x, y and z in general expression (I), each representing the relative number of atoms of an element, to the above range is as follows:

x represents the relative number of atoms of Mg at the A site, and is set in the range of $0<x<1$. This is because, when x is 0, which means that no Mg is contained, or when x is 1 or greater, the property of the rare-earth magnesium alloy that it stores a large amount of hydrogen at the room temperature is lost. The desirable range for x is $0.05\leq x\leq0.35$.

y represents the relative number of atoms of Ni at the B site, and is set in the range of $0\leq y\leq0.5$. This is because, when y is greater than 0.5, the amount of hydrogen stored by the hydrogen-storing alloy decreases.

z represents the relative number of atoms at the B site, and is set in the range of $2.5\leq z\leq4.5$. This is because, when z is too small, the stability of hydrogen stored in the hydrogen-storing alloy increases, so that the hydrogen-storing alloy's capability of releasing hydrogen deteriorates; and when z is too great, the number of hydrogen-storing sites in the hydrogen-storing alloy decreases, so that the hydrogen-storing alloy's capability of storing hydrogen begins to deteriorate.

The reason for which a1, b1, c1, d1 and e1 should satisfy the relation $a1+b1+c1+d1+e1=1$ is to allow La, Ce, Nd, Pr and T1 to occupy the A site with Mg, or in other words, to satisfy the condition $(a1+b1+c1+d1+e1)\times(1-y)+y=1$.

Meanwhile, as mentioned above, the hydrogen-storing alloy particles 37 in the cell are the particles of an $AB_5$ ($CaCu_5$) type rare-earth alloy, and the composition thereof is expressed by general expression (II):

$$La_{a2}Ce_{b2}Pr_{c2}Nd_{d2}(A2)_{e2}(Ni_{1-f}(T2)_f)_i$$

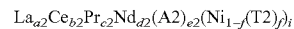

where A2 represents an element which occupies the A site, and which is at least one element selected from a group consisting of Pm, Sm, Eu, Gd, Tb, Dy, Ho, Er, Tm, Yb, Lu, Ca, Sr, Sc, Y, Ti, Zr and Hf; T2 represents an element which occupies the B site, and which is at least one element selected from a group consisting of V, Nb, Ta, Cr, Mo, Mn, Fe, Co, Al, Ga, Zn, Sn, In, Cu, Si, P and B; a2, b2, c2, d2 and e2 are in the range of $0 \leq a2$, $0 \leq b2$, $0.01 \leq c2$, $0.01 \leq d2$ and $0 \leq e2$ and satisfy the relation $a2+b2+c2+d2+e2=1$; and f and i are in the range of $0 \leq f \leq 1$ and $4.5 \leq i \leq 5.5$.

The negative-electrode plate 26 can be obtained by applying a slurry consisting of the first hydrogen-storing alloy particles 36, the second hydrogen-storing alloy particles 37, the binder 38, water, and the electrically-conductive agent added as necessary, onto the punching metal plate which forms the negative-electrode substrate, then drying, rolling and cutting this punching metal plate.

In preparing the slurry, the first hydrogen-storing alloy particles 36 and the second hydrogen-storing alloy particles 37 may be mixed from the beginning. Alternatively, a slurry containing the first hydrogen-storing alloy particles 36 and a slurry containing the second hydrogen-storing alloy particles 37 may be prepared separately and then mixed to obtain a slurry containing the first hydrogen-storing alloy particles 36 and the second hydrogen-storing alloy particles 37.

The hydrogen-storing alloy particles 36 can be obtained as follows:

First, the metal materials are measured out to meet the above-mentioned composition and mixed. The mixture is melted, for example, in the high-frequency melting furnace, and formed into an ingot. The ingot obtained is subjected to heat treatment, in which the ingot is heated in the inert gas atmosphere of temperature 900 to 1200° C. for 5 to 24 hours to thereby change the metal structure of the ingot into a superlattice structure consisting of the $AB_5$ structure and the $AB_2$ structure. Then, the ingot is pulverized and the particles obtained are sieved to separate those of a desired particle size as the first hydrogen-storing alloy particles 36.

The cell having the structure described above is suited to improve the volume energy density, since the negative-electrode plate 26 contains the first hydrogen-storing alloy particles 36. Since it is arranged that the volumetric proportion of the positive-electrode plate 24 is in the range of 48% to 60%, the volume energy density in the range of 340 Wh/l to 450 Wh/l can be achieved with certainty.

Meanwhile, in this cell, since the negative-electrode plate 26 contains the second hydrogen-storing alloy particles 37, corrosion reaction between magnesium contained in the first hydrogen-storing alloy particles 36 and the alkaline electrolyte is suppressed. Besides, in this cell, by decreasing the proportion of La in the first hydrogen-storing alloy particles 36, corrosion reaction in which magnesium contained in the first hydrogen-storing alloy particles 36 reacts with the alkaline electrolyte to form magnesium hydroxide is further suppressed. Since the alkaline electrolyte held in the separator 28 is not consumed in corrosion reaction, increase in internal resistance is suppressed. Consequently, the cell has a long life although the amount of the alkaline electrolyte is decreased to achieve a high volume energy density.

The present invention is not limited to the described embodiment. It can be modified in various ways.

For example, the proportion of the mass of the second hydrogen-storing alloy particles 37 relative to the total mass of the first and second hydrogen-storing alloy particles 36, 37 is not limited to a specific value, but preferably in the range of 5% to 50%.

When the proportion of the mass of the second hydrogen-storing alloy particles 37 is set to 5% or higher, the electrode has a longer life with certainty, compared with the case in which the first hydrogen-storing alloy particles 36 are used solely. Meanwhile, the proportion of the mass of the second hydrogen-storing alloy particles 37 is set to 50% or lower, in order to prevent decrease in cell capacity caused by increase of the second hydrogen-storing alloy particles 37 which is lower in capacity than the first hydrogen-storing alloy particles 36, and in order to prevent decrease in discharge capacity immediately after continuous charging.

When the proportion by mass of the second hydrogen-storing alloy particles 37 is great, oxygen produced in overcharging is not sufficiently reduced, so that the hydrogen-storing alloy particles 36 deteriorate by oxidation, which causes decrease in discharge capacity. Hence, the proportion by mass of the second hydrogen-storing alloy particles 37 is limited to ensure that oxygen produced in overcharging is sufficiently reduced to thereby prevent the decrease in discharge capacity caused by the deterioration of the hydrogen-storing alloy particles 36 due to oxidation.

In the described embodiment, the proportion of Ce in the first hydrogen-storing alloy particles 36 and the proportion of Ce in the second hydrogen-storing alloy particles 37 are each not limited to a specific value. However, it is preferable that b1 in general expression (I) is 0.2 or smaller and b2 in general expression (II) is 0.1 or greater.

The reason is that by decreasing the proportion of Ce in the first hydrogen-storing alloy particles 36, the corrosion reaction in which magnesium contained in the first hydrogen-storing alloy particles 36 reacts with the alkaline electrolyte to form magnesium hydroxide can be suppressed.

In this preferable arrangement, decrease in discharge capacity in re-discharging can also be suppressed.

The problem that the discharge capacity decreases in re-discharging is observed, when the proportion of Ce in the first hydrogen-storing alloy particles is small, so that the amount of Ce contained in the secondary cell is small. Hence, in this preferable arrangement, in order to hold an adequate amount of Ce in the hydrogen-storing alloy electrode or in the secondary cell even when the proportion of Ce in the first hydrogen-storing alloy particles is small, the proportion of Ce in the second hydrogen-storing alloy particles is increased.

In the described embodiment, the respective proportions of Nd and Pr in the first hydrogen-storing alloy particles 36 are each not limited to a specific value. However, c1 in general expression (I) is preferably 0.30 or smaller, and d1 in general expression (I) is preferably 0.30 or smaller. In these preferable arrangements, by decreasing the proportion of Nd or the proportion of Pr, the corrosion reaction of the first hydrogen-storing alloy particles 36 can be further suppressed.

In the described embodiment, the equilibrium hydrogen pressure and average particle size for the first hydrogen-storing alloy particles 36 and the second hydrogen-storing alloy particles 37 are not limited to specific values. However, it is preferable that the first hydrogen-storing alloy particles 36 are lower in equilibrium hydrogen pressure than the second hydrogen-storing alloy particles 37, and it is preferable that the first hydrogen-storing alloy particles 36 are greater in average particle size than the second hydrogen-storing alloy particles 37. In these preferable arrangements, decrease in discharge capacity immediately after continuous charging can be prevented. Besides, the latter arrangement enables a longer cell life.

When the positive-electrode plate 24 is overcharged in continuous charging, γ-NiOOH which is low in discharge performance is produced, so that the operating voltage decreases. However, decrease in discharge performance of the cell as a whole can be prevented by improving the discharge performance of the hydrogen-storing alloy electrode which forms the negative-electrode plate 26. Hence, in these preferable arrangements, by improving the discharge performance of the second hydrogen-storing alloy particles 37, which are lower in discharge performance than the first hydrogen-storing alloy particles 36, by increasing the equilibrium hydrogen pressure or decreasing the particle size, decrease in discharge capacity immediately after continuous charging is prevented.

The first hydrogen-storing alloy particles 36 are low in alkaline resistance. Hence, in the above arrangement, by making the particle size of the first hydrogen-storing alloy particles 36 greater than that of the second hydrogen-storing alloy particles 37 to thereby decrease the surface area of the first hydrogen-storing alloy particles 36, the first hydrogen-storing alloy particles 36 are prevented from corroding, so that the cell can have a longer life.

In the described embodiment, while the first hydrogen-storing alloy particles 36 need to have the composition expressed by general expression (I) and the second hydrogen-storing alloy particles 37 need to have the composition expressed by general expression (II), the first hydrogen-storing alloy particles 36 as well as the second hydrogen-storing alloy particles 37 do not need to have a single composition. In other words, as the first hydrogen-storing alloy particles 36, two or more types of hydrogen-storing alloy particles different in composition can be used. Likewise, as the second hydrogen-storing alloy particles 37, two or more types of hydrogen-storing alloy particles different in composition can be used.

In the described embodiment, the volume energy density for the secondary cell is set to 450 Wh/l or lower, since, otherwise, the secondary cell has a shorter life due to reasons other than the alkaline resistance of the hydrogen-storing alloy particles. However, the above-described hydrogen-storing alloy electrode can be applied to secondary cells having a volume energy density higher than 450 Wh/l. In respect of the structure of the secondary cell, the cell size, the volume energy density, the volumetric proportion of the positive-electrode plate, etc. are not limited to the ranges mentioned above.

EXAMPLES

1. Assembly of Cells

Example 1

1) Preparation of a Negative-electrode Plate

Using the induction melting furnace, an ingot of a hydrogen-storing alloy containing misch metal, Mg, Ni and Co in the mole ratio of 0.70:0.30:2.5:0.5 was cast, where the misch metal contained 20% of La, 5% of Ce, 35% of Pr, 35% of Nd and 5% of Y as main components. The ingot was subjected to the heat treatment in which it was heated in the argon atmosphere of temperature 1000° C. for 10 hours to make the desired metal structure, and thereby made into a block of a hydrogen-storing alloy having composition expressed by the general expression $(La_{0.20}Ce_{0.05}Pr_{0.35}Nd_{0.35}Y_{0.05})_{0.7}Mg_{0.3}Ni_{2.5}Co_{0.5}$ as shown in Table 1.

This block of the hydrogen-storing alloy was mechanically pulverized in the inert gas atmosphere, and then sieved to separate first hydrogen-storing alloy particles. Regarding these first hydrogen-storing alloy particles, the particle size distribution was measured using the laser diffraction particle size analyzer. The average particle size corresponding to weight integral 50% was found to be 30 μm as shown in Table 2. Further, the equilibrium hydrogen pressure of these first hydrogen-storing alloy particles in the atmosphere of temperature 80° C. at H/M=0.4 was measured. It was found to be 0.166 Mpa as shown in Table 2.

Next, using the induction melting furnace, an ingot of a hydrogen-storing alloy containing misch metal, Ni, Co, Al and Mn in the mole ratio of 1.0:4.0:0.8:0.3:0.3 was cast, where the misch metal contained 78% of La, 20% of Ce, 1% of Pr and 1% of Nd as main components. The ingot was subjected to the heat treatment in which it was heated in the argon atmosphere of temperature 1000° C. for 10 hours to make the desired metal structure, and thereby made into a block of a hydrogen-storing alloy having composition expressed by the general expression $La_{0.78}Ce_{0.20}Pr_{0.01}Nd_{0.01}Ni_{4.0}Co_{0.8}Al_{0.3}Mn_{0.3}$ as shown in Table 1.

As in the case of the first hydrogen-storing alloy particles, this block of the hydrogen-storing alloy was mechanically pulverized in the inert gas atmosphere, and then sieved to separate second hydrogen-storing alloy particles. Regarding these second hydrogen-storing alloy particles, the particle size distribution was measured using the laser diffraction particle size analyzer. The average particle size corresponding to weight integral 50% was found to be 30 μm as shown in Table 2. Further, the equilibrium hydrogen pressure of these second hydrogen-storing alloy particles in the atmosphere of temperature 80° C. at H/M=0.4 was measured. It was found to be 0.142 Mpa as shown in Table 2.

To 95 mass-parts of the obtained first hydrogen-storing alloy particles, 5 mass-parts of the second hydrogen-storing alloy particles, 0.4 mass-parts of sodiumpolyacrylate, 0.1 mass-parts of carboxymethyl-cellulose and 2.5 mass-parts of polytetrafluoroethylene dispersion (medium: water, 60 mass-parts of solid components) were added and mixed together to obtain a slurry for a negative-electrode mixture.

The slurry obtained was applied onto both surfaces of an Fe punching metal plate, which is Ni-plated with a thickness 60 μm, to cover the whole of each surface with a uniform thickness. After the slurry dried, the punching metal plate with the dried slurry on was pressed and cut to form a negative-electrode plate for a nickel-hydrogen secondary cell of size AA.

2) Preparation of a Positive-electrode Plate

A mixed solution of nickel sulfate, zinc sulfate and cobalt sulfate was prepared so that the proportions of Zn and Co relative to metal Ni were 3 mass % and 1 mass %, respectively. To this mixed solution, an aqueous solution of sodium hydroxide was gradually added, while the mixture was being stirred. In this process, by keeping pH at 13 to 14 during reaction, nickel hydroxide particles were precipitated. The nickel hydroxide particles were washed with pure water of ten times the amount, three times, then dehydrated and dried.

The nickel hydroxide particles obtained and 40 mass % of HPC dispersion were mixed to prepare a slurry for a positive-electrode mixture. The slurry was packed in a porous nickel substrate and dried. Then, the dried substrate was rolled and cut to form a positive-electrode plate for a nickel-hydrogen secondary cell of size AA.

3) Assembly of a Nickel-hydrogen Secondary Cell

The negative-electrode plate and positive electrode plate obtained in the way described above were rolled up with a separator of polypropylene or nylon non-woven fabric inserted between to form an electrode assembly. After the electrode assembly was set in a case, an aqueous solution of potassium hydroxide of 30 mass % in concentration containing lithium and sodium was put in the case. Thus, a nickel-hydrogen secondary cell of size AA and volume energy density 300 Wh/l having a structure shown in the FIGURE was assembled.

Example 2

A nickel-hydrogen secondary cell was assembled in the same way as example 1, except that the second hydrogen-storing alloy particles were made to have composition. $La_{0.90}Ce_{0.06}Pr_{0.02}Nd_{0.02}Ni_{4.0}Co_{0.8}Al_{0.3}Mn_{0.3}$.

Example 3

A nickel-hydrogen secondary cell was assembled in the same way as example 1, except that in preparing a negative-electrode mixture slurry, 50 mass-parts of the first hydrogen-storing alloy particles and 50 mass-parts of the second hydrogen-storing alloy particles were mixed.

Example 4

A nickel-hydrogen secondary cell was assembled in the same way as example 1, except that in preparing a negative-electrode mixture slurry, 40 mass-parts of the first hydrogen-storing alloy particles and 60 mass-parts of the second hydrogen-storing alloy particles were mixed.

Example 5

A nickel-hydrogen secondary cell was assembled in the same way as example 1, except that the first hydrogen-storing alloy particles were made to have composition $(La_{0.25}Ce_{0.05}Pr_{0.34}Nd_{0.34}Y_{0.02})_{0.7}Mg_{0.3}.Ni_{2.5}Co_{0.5}$.

Example 6

A nickel-hydrogen secondary cell was assembled in the same way as example 1, except that the second hydrogen-storing alloy particles were made to have composition $La_{0.48}Ce_{0.20}Pr_{0.16}Nd_{0.16}Ni_{4.0}Co_{0.8}Al_{0.3}Mn_{0.1}$. It is to be noted that in this case, the equilibrium hydrogen pressure of the second hydrogen-storing alloy particles was found to be higher than the equilibrium hydrogen pressure of the first hydrogen-storing alloy particles.

Example 7

A nickel-hydrogen secondary cell was assembled in the same way as example 1, except that the average particle size of the first hydrogen-storing alloy particles was 60 μm.

Example 8

A nickel-hydrogen secondary cell was assembled in the same way as example 1, except that the average particle size of the second hydrogen-storing alloy particles was 60 μm.

Example 9

A nickel-hydrogen secondary cell was assembled in the same way as example 1, except that the second hydrogen-storing alloy particles were made to have composition $La_{0.92}Ce_{0.04}Pr_{0.02}Nd_{0.02}Ni_{4.0}Co_{0.8}Al_{0.3}Mn_{0.3}$.

Comparative Example 1

A nickel-hydrogen secondary cell was assembled in the same way as example 1, except that the first hydrogen-storing alloy particles were made to have composition $(La_{0.50}Ce_{0.35}Pr_{0.05}Nd_{0.05}Ti_{0.05})_{0.7}Mg_{0.3}Ni_{2.5}Co_{0.5}$ and the second hydrogen-storing alloy particles were not mixed.

Comparative Example 2

A nickel-hydrogen secondary cell was assembled in the same way as example 1, except that the second hydrogen-storing alloy particles were not mixed.

Comparative Example 3

A nickel-hydrogen secondary cell was assembled in the same way as example 1, except that the first hydrogen-storing alloy particles were made to have composition $(La_{0.31}Ce_{0.05}Pr_{0.32}Nd_{0.32})_{0.7}Mg_{0.3}Ni_{2.5}Co_{0.5}$.

It is to be noted that in any of the above examples, the slurry was prepared in the manner that the first hydrogen-storing alloy particles and the second hydrogen-storing alloy particles were simultaneously mixed with the other materials. However, the slurry may be prepared in the manner that a negative-electrode mixture slurry containing only the first hydrogen-storing alloy particles and a negative-electrode mixture slurry containing only the second hydrogen-storing alloy particles are prepared separately and then mixed in a predetermined ratio.

2. Evaluation Test of Cells

1) Evaluation of the Cell Life

For each of the cells in examples 1 to 9 and comparative examples 1 to 3, the measurement of the cell capacity conducted in the manner that, in the environment of temperature 25° C., the cell was charged with a current of 120 mA for 16 hours and then discharged with a current of 1200 mA up to the termination voltage 0.5V was repeated. How many times this measurement cycle was repeated until the discharge capacity deceased to 60% or lower of the initial discharge capacity was counted. The number of times thus obtained is shown in Table 2 as the cell life. It is to be noted that the cell life in Table 2 is expressed as a value relative to the cell life in example 1 which is considered as 100.

2) Evaluation of the Discharge Capacity Immediately After Continuous Charging and the Discharge Capacity After Recharging For each of the cells in examples 1 to 9 and comparative examples 1 to 3, the initial discharge capacity was measured in the manner that, in the environment of temperature 25° C., the cell was charged with a current of 120 mA for 16 hours and then discharged with a current of 1200 mA up to the termination voltage 0.5V. Next, the cell was charged with a current of 60 mA for 2 weeks and then discharged with a current of 1200 mA up to the termination voltage 0.5V to thereby measure the discharge capacity immediately after continuous charging. Then, the cell was charged with a current of 120 mA for 16 hours and then discharged with a current of 1200 mA up to the termination voltage 0.5V to thereby measure the discharge capacity in re-discharging. The discharge capacity after continuous charging and discharge capacity in re-discharging thus obtained are shown in Table 2. It is to be noted that the discharge capacity after continuous charging and discharge capacity in re-discharging in Table 2 are each expressed as a value relative to the initial discharge capacity which is considered as 100.

ticles, in order to prevent decrease in discharge capacity when the cell is re-discharged.

TABLE 1

| | Composition | |
|---|---|---|
| | First hydrogen-storing alloy particles | Second hydrogen-storing alloy particles |
| Example 1 | (La0.20Ce0.05Pr0.35Nd0.35Y0.05)0.7Mg0.3Ni2.5Co0.5 | La0.78Ce0.20Pr0.01Nd0.01Ni4.0Co0.8Al0.3Mn0.3 |
| Example 2 | (La0.20Ce0.05Pr0.35Nd0.35Y0.05)0.7Mg0.3Ni2.5Co0.5 | La0.90Ce0.06Pr0.02Nd0.02Ni4.0Co0.8Al0.3Mn0.3 |
| Example 3 | (La0.20Ce0.05Pr0.35Nd0.35Y0.05)0.7Mg0.3Ni2.5Co0.5 | La0.78Ce0.20Pr0.01Nd0.01Ni4.0Co0.8Al0.3Mn0.3 |
| Example 4 | (La0.20Ce0.05Pr0.35Nd0.35Y0.05)0.7Mg0.3Ni2.5Co0.5 | La0.78Ce0.20Pr0.01Nd0.01Ni4.0Co0.8Al0.3Mn0.3 |
| Example 5 | (La0.25Ce0.05Pr0.34Nd0.34Y0.02)0.7Mg0.3Ni2.5Co0.5 | La0.78Ce0.20Pr0.01Nd0.01Ni4.0Co0.8Al0.3Mn0.3 |
| Example 6 | (La0.20Ce0.05Pr0.35Nd0.35Y0.05)0.7Mg0.3Ni2.5Co0.5 | La0.48Ce0.20Pr0.16Nd0.16Ni4.2Co0.8Al0.3Mn0.1 |
| Example 7 | (La0.20Ce0.05Pr0.35Nd0.35Y0.05)0.7Mg0.3Ni2.5Co0.5 | La0.78Ce0.20Pr0.01Nd0.01Ni4.0Co0.8Al0.3Mn0.3 |
| Example 8 | (La0.20Ce0.05Pr0.35Nd0.35Y0.05)0.7Mg0.3Ni2.5Co0.5 | La0.78Ce0.20Pr0.01Nd0.01Ni4.0Co0.8Al0.3Mn0.3 |
| Example 9 | (La0.20Ce0.05Pr0.35Nd0.35Y0.05)0.7Mg0.3Ni2.5Co0.5 | La0.92Ce0.04Pr0.02Nd0.02Ni4.0Co0.8Al0.3Mn0.3 |
| Comp. ex. 1 | (La0.50Ce0.35Pr0.05Nd0.05Ti0.05)0.7Mg0.3Ni2.5Co0.5 | — |
| Comp. ex. 2 | (La0.20Ce0.05Pr0.35Nd0.35Y0.05)0.7Mg0.3Ni2.5Co0.5 | — |
| Comp. ex. 3 | (La0.31Ce0.05Pr0.32Nd0.32)0.7Mg0.3Ni2.5Co0.5 | La0.78Ce0.20Pr0.01Nd0.01Ni4.0Co0.8Al0.3Mn0.3 |

TABLE 2

| | First hydrogen-storing alloy particles | | Second hydrogen-storing alloy particles | | Proportion by mass of second hydrogen-storing particles (%) | Cell evaluation | | |
|---|---|---|---|---|---|---|---|---|
| | Particle size ($\mu$m) | Equilibrium hydrogen pressure (MPa) | Particle size ($\mu$m) | Equilibrium hydrogen pressure (MPa) | | Cell life | Discharge capacity immediately after continuous charging | discharge capacity in re-discharging |
| Example 1 | 30 | 0.166 | 30 | 0.142 | 5 | 100 | 94 | 98 |
| Example 2 | 30 | 0.166 | 30 | 0.108 | 5 | 99 | 94 | 82 |
| Example 3 | 30 | 0.166 | 30 | 0.142 | 50 | 105 | 90 | 97 |
| Example 4 | 30 | 0.166 | 30 | 0.142 | 60 | 106 | 72 | 98 |
| Example 5 | 30 | 0.150 | 30 | 0.142 | 5 | 98 | 94 | 97 |
| Example 6 | 30 | 0.166 | 30 | 0.194 | 5 | 100 | 97 | 98 |
| Example 7 | 60 | 0.166 | 30 | 0.142 | 5 | 110 | 97 | 98 |
| Example 8 | 30 | 0.166 | 60 | 0.142 | 5 | 100 | 92 | 98 |
| Example 9 | 30 | 0.166 | 30 | 0.095 | 5 | 99 | 94 | 76 |
| Comp. ex. 1 | 30 | 0.121 | — | — | 0 | 79 | 89 | 98 |
| Comp. ex. 2 | 30 | 0.166 | — | — | 0 | 98 | 92 | 72 |
| Comp. ex. 3 | 30 | 0.144 | 30 | 0.142 | 5 | 95 | 94 | 98 |

From Table 1 and Table 2, the following are clear:

(1) The cell life in examples 1 to 9 and comparative example 2 is longer than that in comparative examples 1 and 3.

The reason is thought to be that the hydrogen-storing alloy electrode in examples 1 to 9 contains the second hydrogen-storing alloy particles and the proportion of La in the second hydrogen-storing alloy particles is small (a1 $\leq$ 0.25).

In respect of comparative example 2, the reason is thought to be as follows: Although the hydrogen-storing alloy electrode does not contain the second hydrogen-storing alloy particles, the respective proportions of La and Ce in the first hydrogen-storing alloy particles are small, so that the first hydrogen-storing alloy particles have an improved alkaline resistance.

(2) Comparison of example 1 and comparative example 2 shows that while both are almost equal in the discharge capacity immediately after continuous charging, comparative example 2 showed a great decrease in discharge capacity when the cell was re-discharged. This shows that when the proportion of Ce in the first hydrogen-storing particles is small, it is preferable to use the hydrogen-storing alloy electrode containing the second hydrogen-storing alloy particles, in order to prevent decrease in discharge capacity when the cell is re-discharged.

(3) The comparison of the discharge capacities in re-discharging in examples 1, 2 and 9 shows that desirably, the proportion of Ce in the second hydrogen-storing alloy particles should be 0.05 or greater, and more desirably, 0.10 or greater.

(4) The fact that the discharge capacity immediately after continuous charging is lower in example 4 than in example 3 shows that it is preferable that the proportion by mass of the second hydrogen-storing alloy particles is 50% or lower. Further, the data on example 1 shows that it is preferable that the proportion by mass of the second hydrogen-storing alloy particles is 5% or higher.

(5) The fact that the discharge capacity immediately after continuous charging is higher in example 6 than in example 1 shows that it is preferable that the equilibrium hydrogen pressure of the first hydrogen-storing alloy particles is lower than that of the second hydrogen-storing alloy particles.

(6) The fact that the cell life is longer in example 7 than in example 1 shows that it is preferable that the average particle size of the first hydrogen-storing alloy particles is greater than that of the second hydrogen-storing alloy particles.

(7) The fact that the discharge capacity immediately after continuous charging is lower in example 8 than in example 1 shows that it is preferable that the average particle size of the first hydrogen-storing alloy particles is greater than that of the second hydrogen-storing alloy particles.

The invention thus described, it will be obvious that the same may be varied in many ways. Such variations are not to be regarded as a departure from the sprit and scope of the invention, and all such modifications as would be obvious to one skilled in the art are intended to be included within the scope of the following claims.

What is claimed is:

1. A hydrogen-storing alloy electrode comprising:
first hydrogen-storing alloy particles having composition expressed by general expression (I):

$$(La_{a1}Ce_{b1}Pr_{c1}Nd_{d1}(A1)_{e1})_{1-x}Mg_x(Ni_{1-y}(T1)_y)_z$$

where A1 represents at least one element selected from a group consisting of Pm, Sm, Eu, Gd, Tb, Dy, Ho, Er, Tm, Yb, Lu, Ca, Sr, Sc, Y, Ti, Zr and Hf; T1 represents at least one element selected from a group consisting of V, Nb, Ta, Cr, Mo, Mn, Fe, Co, Al, Ga, Zn, Sn, In, Cu, Si, P and B; a1, b1, c1, d1 and e1 are in the range of $0<a1\leq0.25$, $0\leq b1$, $0\leq c1$, $0\leq d1$ and $0\leq e1$ and satisfy the relation $a1+b1+c1+d1+e1=1$; and x, y and z are in the range of $0<x<1$, $0\leq y\leq0.5$ and $2.5\leq z\leq4.5$; and
second hydrogen-storing alloy particles having composition expressed by general expression (II):

$$La_{a2}Ce_{b2}Pr_{c2}Nd_{d2}(A2)_{e2}(Ni_{1-f}(T2)_f)_i$$

where A2 represents at least one element selected from a group consisting of Pm, Sm, Eu, Gd, Tb, Dy, Ho, Er, Tm, Yb, Lu, Ca, Sr, Sc, Y, Ti, Zr and Hf; T2 represents at least one element selected from a group consisting of V, Nb, Ta, Cr, Mo, Mn, Fe, Co, Al, Ga, Zn, Sn, In, Cu, Si, P and B; a2, b2, c2, d2 and e2 are in the range of $0\leq a2$, $0\leq b2$, $0.01\leq c2$, $0.01\leq d2$ and $0\leq e2$ and satisfy the relation $a2+b2+c2+d2+e2=1$; and f and i are in the range of $0\leq f\leq1$ and $4.5\leq i\leq5.5$.

2. The electrode according to claim 1, wherein the proportion of the mass of the second hydrogen-storing alloy particles relative to the total mass of the first and second hydrogen-storing alloy particles is in the range of 5% to 50%.

3. The electrode according to claim 2, wherein b1 in general expression (I) is 0.2 or smaller, and b2 in general expression (II) is 0.05 or greater.

4. The electrode according to claim 3, wherein b2 in general expression (II) is 0.1 or greater.

5. The electrode according to claim 4, wherein c1 in general expression (I) is 0.30 or smaller.

6. The electrode according to claim 4, wherein d1 in general expression (I) is 0.30 or smaller.

7. The electrode according to claim 2, wherein the first hydrogen-storing alloy particles are lower in equilibrium hydrogen pressure than the second hydrogen-storing alloy particles.

8. The electrode according to claim 2, wherein the first hydrogen-storing alloy particles are greater in average particle size than the second hydrogen-storing alloy particles.

9. A secondary cell, comprising:
a positive-electrode plate;
a hydrogen-storing alloy electrode as a negative-electrode plate, the electrode including,
first hydrogen-storing alloy particles having composition expressed by general expression (I):

$$(La_{a1}Ce_{b1}Pr_{c1}Nd_{d1}(A1)_{e1})_{1-x}Mg_x(Ni_{1-y}(T1)_y)_z$$

where A1 represents at least one element selected from a group consisting of Pm, Sm, Eu, Gd, Tb, Dy, Ho, Er, Tm, Yb, Lu, Ca, Sr, Sc, Y, Ti, Zr and Hf; T1 represents at least one element selected from a group consisting of V, Nb, Ta, Cr, Mo, Mn, Fe, Co, Al, Ga, Zn, Sn, In, Cu, Si, P and B; a1, b1, c1, d1 and e1 are in the range of $0<a1\leq0.25$, $0\leq b1$, $0\leq c1$, $0\leq d1$ and $0\leq e1$ and satisfy the relation $a1+b1+c1+d1+e1=1$; and x, y and z are in the range of $0<x<1$, $0\leq y\leq0.5$ and $2.5\leq z\leq4.5$, and,
second hydrogen-storing alloy particles having composition expressed by general expression (II):

$$La_{a2}Ce_{b2}Pr_{c2}Nd_{d2}(A2)_{e2}(Ni_{1-f}(T2)_f)_i$$

where A2 represents at least one element selected from a group consisting of Pm, Sm, Eu, Gd, Tb, Dy, Ho, Er, Tm, Yb, Lu, Ca, Sr, Sc, Y, Ti, Zr and Hf; T2 represents at least one element selected from a group consisting of V, Nb, Ta, Cr, Mo, Mn, Fe, Co, Al, Ga, Zn, Sn, In, Cu, Si, P and B; a2, b2, c2, d2 and e2 are in the range of $0\leq a2$, $0\leq b2$, $0.01\leq c2$, $0.01\leq d2$ and $0\leq e2$ and satisfy the relation $a2+b2+c2+d2+e2=1$; and f and i are in the range of $0\leq f\leq1$ and $4.5\leq i\leq5.5$; and
a separator inserted between the positive-electrode plate and the negative-electrode plate and holding an alkaline electrolyte.

10. The secondary cell according to claim 9, wherein the secondary cell comprises a cylindrical case having an outside diameter in the range of 13.5 mm to 14.5 mm, an electrode assembly including the positive-electrode plate, the negative-electrode plate and the separator rolled up together is set in the case with the outermost turn of the negative-electrode plate being in contact with the inner circumferential surface of the case, the secondary cell has a volume energy density in the range of 340 Wh/l to 450 Wh/l, and the volumetric proportion of the positive-electrode plate is in the range of 48% to 60%.

11. The secondary cell according to claim 10, wherein the proportion of the mass of the second hydrogen-storing alloy particles relative to the total mass of the first and second hydrogen-storing alloy particles is in the range of 5% to 50%.

12. The secondary cell according to claim 11, wherein b1 in general expression (I) is 0.2 or smaller, and b2 in general expression (II) is 0.05 or greater.

13. The secondary cell according to claim 12, wherein b2 in general expression (II) is 0.1 or greater.

14. The secondary cell according to claim 13, wherein c1 in general expression (I) is 0.30 or smaller.

15. The secondary cell according to claim 13, wherein d1 in general expression (I) is 0.30 or smaller.

16. The secondary cell according to claim 11, wherein the first hydrogen-storing alloy particles are lower in equilibrium hydrogen pressure than the second hydrogen-storing alloy particles.

17. The secondary cell according to claim 11, wherein the first hydrogen-storing alloy particles are greater in average particle size than the second hydrogen-storing alloy particles.

* * * * *